US011159361B2

(12) United States Patent
Small et al.

(10) Patent No.: US 11,159,361 B2
(45) Date of Patent: *Oct. 26, 2021

(54) METHOD AND APPARATUS FOR PROVIDING NOTIFICATION OF DETECTED ERROR CONDITIONS IN A NETWORK

(71) Applicant: AT&T Intellectual Property I, L.P., Atlanta, GA (US)

(72) Inventors: David B. Small, Dublin, CA (US); Thomas Spencer, IV, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,923

(22) Filed: Aug. 23, 2019

(65) Prior Publication Data

US 2019/0387018 A1 Dec. 19, 2019

Related U.S. Application Data

(63) Continuation of application No. 15/707,616, filed on Sep. 18, 2017, now Pat. No. 10,397,268, which is a
(Continued)

(51) Int. Cl.
*H04L 29/06* (2006.01)
*H04L 12/24* (2006.01)
(Continued)

(52) U.S. Cl.
CPC .......... *H04L 41/0654* (2013.01); *G06F 21/00* (2013.01); *H04L 63/1408* (2013.01);
(Continued)

(58) Field of Classification Search
CPC ............ H04L 63/1441; H04L 41/0654; H04L 63/1408; G06F 21/00; H04W 12/12
(Continued)

(56) References Cited

U.S. PATENT DOCUMENTS 5,812,671 A 9/1998 Ross, Jr.
6,996,070 B2 2/2006 Starr et al.
(Continued)

OTHER PUBLICATIONS

Ford, "Breaking Up the Transport Logjam", 2008, academia, pp. 1-6 (Year: 2008).*
(Continued)

*Primary Examiner* — Taghi T Arani
*Assistant Examiner* — Gregory A Lane

(57) ABSTRACT

Methods for managing a communication session in a communication network are disclosed. For example, a method includes detecting, by a first endpoint comprising at least one processor, an error condition associated with the communication session, sending, by the first endpoint, a notification of the error condition to a second endpoint that is using a transport layer session and receiving, by the first endpoint, a communication from the second endpoint, proposing a response to the error condition. Another method includes receiving, by a first endpoint comprising at least one processor, a notification of an error condition associated with the communication session, selecting, by the first endpoint, a response to the error condition, and sending, by the first endpoint, a communication to a second endpoint that is using a transport layer session, proposing a response to the error condition.

20 Claims, 5 Drawing Sheets

Related U.S. Application Data continuation of application No. 14/792,061, filed on Jul. 6, 2015, now Pat. No. 9,769,196, which is a continuation of application No. 13/563,455, filed on Jul. 31, 2012, now Pat. No. 9,075,953.

(51) Int. Cl.
*H04W 12/126* (2021.01)
*G06F 21/00* (2013.01)

(52) U.S. Cl.
CPC ....... *H04L 63/1441* (2013.01); *H04W 12/126* (2021.01); *H04L 41/0686* (2013.01); *H04L 69/16* (2013.01)

(58) Field of Classification Search
USPC .......................................................... 726/23
See application file for complete search history.

(56) References Cited

U.S. PATENT DOCUMENTS

| | | | |
|---|---|---|---|
| 7,272,854 B2 | 9/2007 | Marceau | |
| 7,613,755 B1* | 11/2009 | Venkatachary | ... G06F 16/90344 708/212 |
| 7,831,715 B2 | 11/2010 | Yoshimi et al. | |
| 7,930,750 B1* | 4/2011 | Gauvin | ............... H04L 63/1416 726/24 |
| 8,079,076 B2 | 12/2011 | Soin et al. | |
| 8,275,985 B1 | 9/2012 | Narayanan | |
| 8,341,724 B1 | 12/2012 | Burns et al. | |
| 8,423,645 B2 | 4/2013 | Jeffries et al. | |
| 8,429,742 B2 | 4/2013 | Stockdell | |
| 8,515,066 B2 | 8/2013 | Saito et al. | |
| 9,075,953 B2 | 7/2015 | Small et al. | |
| 2003/0154399 A1 | 8/2003 | Zuk et al. | |
| 2004/0098588 A1 | 5/2004 | Ohba et al. | |
| 2004/0225546 A1 | 11/2004 | Oberdorfer et al. | |
| 2005/0038905 A1 | 2/2005 | Banes | |
| 2006/0041938 A1 | 2/2006 | Ali | |
| 2006/0107318 A1 | 5/2006 | Jeffries et al. | |
| 2006/0112272 A1 | 5/2006 | Morioka | |
| 2008/0104390 A1 | 5/2008 | VanHeyningen et al. | |
| 2008/0127323 A1* | 5/2008 | Soin | ........................ H04L 63/18 726/12 |
| 2008/0189554 A1* | 8/2008 | Ali | ........................ H04L 9/0877 713/189 |
| 2008/0263215 A1 | 10/2008 | Schnellbaecher | |
| 2009/0265777 A1 | 10/2009 | Scott | |
| 2010/0050235 A1 | 2/2010 | Hardie | |
| 2010/0064341 A1 | 3/2010 | Aldera | |
| 2010/0122344 A1 | 5/2010 | Wei | |
| 2010/0223492 A1 | 9/2010 | Farrugia et al. | |
| 2010/0232407 A1 | 9/2010 | Navali | |
| 2011/0131654 A1 | 6/2011 | Taneja et al. | |
| 2011/0235806 A1 | 9/2011 | Fukuda | |
| 2011/0296042 A1 | 12/2011 | Li et al. | |
| 2012/0102368 A1 | 4/2012 | Heit et al. | |
| 2013/0086649 A1 | 4/2013 | Battistello | |
| 2013/0227272 A1 | 8/2013 | Cox et al. | |

OTHER PUBLICATIONS

Lu, "High Performance traffic classification based message size sequence and distribution", Dec. 2016, Journal of Network and Computer Applications, p. 60-74.

Standards committee, Standard for Information Technology-Portable Operating System Interface(POSIX), 2008, pp. 552 (Year 2008).

* cited by examiner

METHOD AND APPARATUS FOR PROVIDING NOTIFICATION OF DETECTED ERROR CONDITIONS IN A NETWORK

This application is a continuation of U.S. patent application Ser. No. 15/707,616, filed Sep. 18, 2017, now U.S. Pat. No. 10,397,268, which is a continuation of U.S. patent application Ser. No. 14/792,061, filed Jul. 6, 2015, now U.S. Pat. No. 9,769,196, which is a continuation of U.S. patent application Ser. No. 13/563,455, filed Jul. 31, 2012, now U.S. Pat. No. 9,075,953, all of which are herein incorporated by reference in their entirety.

The present disclosure relates generally to communication networks and, more particularly, to methods, computer-readable media and devices for notifying other endpoints in a communication session of a detected error condition.

BACKGROUND

Numerous devices are capable of using various technologies to access communications networks for voice, data and other forms of communication. For example, user endpoint devices such as mobile handsets, tablet computers, laptop computers and the like may have the capability to communicate using cellular access technologies (e.g., third generation (3G), fourth generation (4G), long term evolution (LTE), global system for mobile communications (GSM), and the like) as well as packet-based wireless access technologies, such as IEEE 802.11 standard, and others. In general, in various Transmission Control Protocol (TCP)/Internet Protocol (IP) network implementations, the transport layer does not provide end-to-end message transfer capabilities independent of the underlying network. Namely, in the current TCP/IP protocol family, TCP and User Datagram Protocol (UDP) are not independent of the network layer protocol (e.g., IP). Thus, message transfer is enabled between pairs of IP addresses and layer four (L4) port tuples.

SUMMARY

In one embodiment, the present disclosure provides methods and devices for managing a communication session in a communication network. For example, in one embodiment a method includes detecting, by a first endpoint comprising at least one processor, an error condition associated with the communication session, sending, by the first endpoint, a notification of the error condition to a second endpoint that is using a transport layer session; and receiving, by the first endpoint, a communication from the second endpoint, proposing a response to the error condition.

In another embodiment, a method includes receiving, by a first endpoint comprising at least one processor, a notification of an error condition associated with the communication session, selecting, by the first endpoint, a response to the error condition, and sending, by the first endpoint, a communication to a second endpoint that is using a transport layer session, proposing a response to the error condition.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
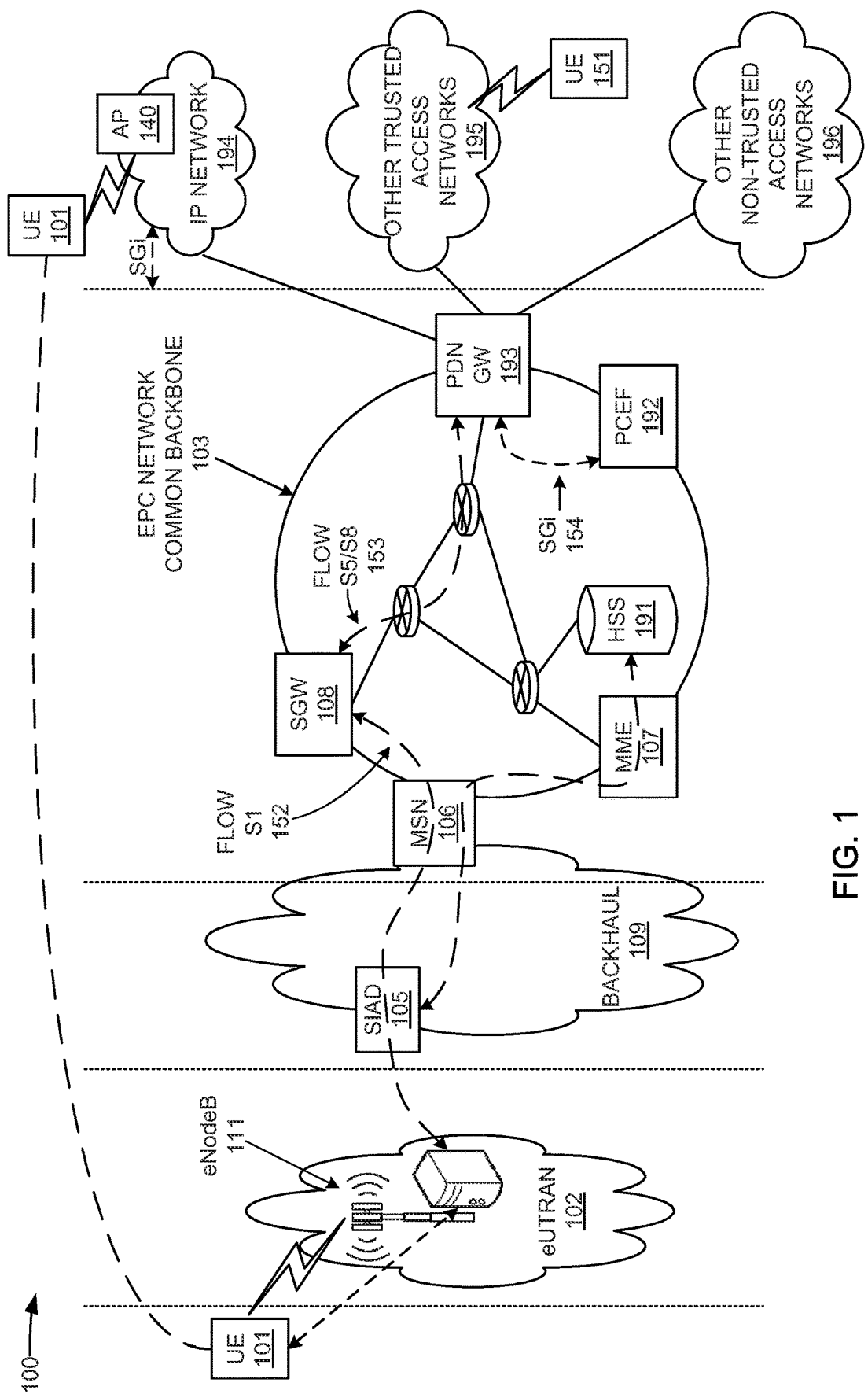
FIG. 1 illustrates an exemplary LTE based network related to the present disclosure.

The present disclosure provides novel methods and devices for managing the security of a session in a communication network. For the purpose of this disclosure, the use of the terms "transport layer communication session", and "transport layer session", are all referring to a session that is established at the transport layer. In one embodiment, the present disclosure involves an established transport layer communication session (e.g., a TCP or TCP/IP session or a UDP session). In one embodiment, the present disclosure provides a novel TCP packet (or segment) structure that enables protocol extensibility and facilitates the transfer, or re-anchoring of a session as the IP address of an endpoint changes, without tearing down the existing session and reestablishing a new session and without tunneling of the connection. Embodiments of the present disclosure will be referred to herein as TCP version 2, or TCPv2. However, it should be noted that TCPv2, as disclosed herein, may replace both TCP as well as UDP. In this regard, it should be noted that embodiments of the present disclosure involve communication sessions in general but in some instances the communication sessions are at the transport layer, e.g., layer 3 according to the TCP/IP network model, or layer 4 according to the Open Systems Interconnection reference model—in other words, where the current versions of TCP and UDP presently operate. The structure of an exemplary TCPv2 packet is described in greater detail below in connection with FIG. 2. A more detailed discussion of the establishment and re-anchoring of a TCPv2 session can be found in the co-pending and commonly assigned application, "Method And Apparatus For Initiating And Maintaining Sessions Between Endpoints", and filed on the same date herewith, the entirety of which is incorporated by reference herein.

As disclosed herein, TCPv2 provides the opportunity for security enhancements over the current TCP protocol. In particular, when a suspected attack on a communication session or other failure conditions (both of which are broadly referred to as error conditions) is detected (e.g., by one of the endpoints), the existing TCP protocol, as well as other session-oriented protocols, provides for two responses: either to drop the session or to ignore the suspected attack. Several deficiencies exist with this arrangement. First, if an endpoint determines that the session should be dropped, the endpoint simply drops the session. However, there is no explicit notification to one or more other endpoints involved in the session. As such, the other endpoint(s) may continue to send packets into the network and may still expect to receive packets from the other endpoint(s). This may lead to data leakage. For example, while the session may be compromised the non-aware endpoints may still continue to send packets into the network until a timeout condition occurs (e.g., failure to receive an acknowledgment within a particular timeframe). In addition, in the case of a man-in-the-middle attack, it may appear to the non-aware endpoints that the session is continuing even though a peer endpoint may have already dropped the session. For example, the man-in-the-middle can receive and respond to packets and spoof source and/or destination IP address and TCP (or user datagram protocol (UDP)) port numbers such that the non-aware endpoints still believe they are involved in a communication session with the endpoint that has already dropped the session.

On the other hand, it may also be problematic for other endpoints when an endpoint that detects a potential attack and/or failure condition (both of which are broadly referred to as error conditions) simply decides to ignore the threat. For example, the endpoint detecting the potential threat may determine that despite the existence of the threat, no action should be taken because the endpoint itself may not be concerned with the detected threat. For example, the session may be conveying to a website non-private information that is freely available, and it is of no consequence that data is leaked to a third-party. However, one or more other endpoints in the session may have a stricter security policy and would drop the session if they were aware of the detected attack. For example, an endpoint may deem it appropriate to drop a session notwithstanding that it is simply accessing public information from a non-password protected public webpage. It may simply be enough that a third-party is attempting to eavesdrop upon the communication. Notably, the existing TCP standards do not adequately address these concerns. In addition UDP has similar deficiencies to those discussed in greater detail herein with respect to TCP.

In contrast to the foregoing, embodiments of the present disclosure provide for explicit notification and sharing of information regarding detected attacks/failure conditions between endpoints in a communication session (e.g., in a TCPv2 session or a TCP session). In this regard, it should be noted that embodiments of the present disclosure apply equally to attacks as well as failure conditions. Thus, an attack or a failure condition as referred to herein may each be considered broadly as an "error condition". It should be noted that the attack may be associated with the transport session layer or another communication session layer. However, in one embodiment, the communication as to how to address the detected attack occurs at the transport session layer. In addition, embodiments of the present disclosure provide for alternative responses aside from the binary choice of taking no action or dropping the session. For example, the endpoints in a communication session can collectively determine a response to take following the detection of a failure condition/attack on the communication session. The response may comprise: dropping the session, continuing the session, logging the session, changing session identifiers, re-negotiating a session key, beginning to use encryption, if none is currently used, upgrading to a more secure cipher suite, re-anchoring or transferring the session to a different network and/or a different device, and the like, rather than just a unilateral decision to drop or continue. Advantageously, where multiple endpoints of a session determine a collective security action, it prevents data leakage and provides the opportunity for all of the endpoints to apply local security policies following the detection of a failure condition/attack. For example, if the endpoints collectively determine to drop a session, no endpoints will continue to send data into the network after the decision is made. In addition, if an endpoint that first detects an attack has a security policy that would ignore the attack, but another endpoint which is notified of the attack has a stricter security policy, the other endpoint is given the opportunity to affect the response to the attack (e.g., to drop the session, re-anchor to a more secure network, change session identifiers, etc.).

To better understand the present disclosure, FIG. 1 illustrates an exemplary network 100 related to the present disclosure (e.g., a Third Generation Partnership Project (3GPP) Long Term Evolution (LTE) network). Although the present disclosure is described in the context of LTE networks, the disclosure is not so limited. Namely, the present disclosure can be equally applied to other types of networks (e.g., wired networks, such as digital subscriber line (DSL) networks, cable networks and optical networks, wireless networks, such as IEEE 802.11 (Wi-Fi) networks and WiMAX networks, other cellular network such as Global System for Mobile Communications (GSM) Enhanced Data rates for GSM Evolution (EDGE) networks and Universal Mobile Telecommunications System (UMTS) code division multiple access (CDMA) networks, satellite networks, etc.), as well communications traversing various combinations of such networks. In one illustrative embodiment, the LTE network 100 comprises an access network 102 (e.g., an evolved Universal Terrestrial Radio Access Network (eU-TRAN)), a backhaul network 109, a core network 103 (e.g., an Evolved Packet Core (EPC) network). Furthermore, although various networks are shown as separate networks in FIG. 1, it is possible that functions performed by these networks can be combined into fewer networks or expanded into a greater number of networks depending on the deployment requirements.

In one illustrative example, the eUTRAN, e.g., eUTRAN 102, may comprise one or more evolved NodeBs (eNodeBs), e.g., 111. In operation, an endpoint device such as user equipment (UE) 101 may access wireless services via an eNodeB, e.g., eNodeB 111 in the eUTRAN 102. UE 101 can be a smart phone, a cellular phone, a computing tablet, a computer or laptop, or any endpoint communication device equipped with wireless capabilities. An eNodeB, such as eNodeB 111, provides wireless interfaces to one or more UE devices. All eNodeBs in the eUTRAN 102 are connected to the EPC network 103 via one or more integrated access devices 105 (e.g., a Smart Integrated Access Device (SIAD)) located in a backhaul network 109. Broadly, an integrated access device is capable of integrating both voice and data services within a single device. In one embodiment, eNodeB 111 supports wireless services covered by one or more cell sites located in eUTRAN 102. It should be noted that any number of eNodeBs can be deployed in eUTRAN 102.

In one embodiment, eUTRAN 102 is connected to the EPC network 103 via the backhaul network 109. For example, SIAD 105 in the backhaul network 109 is connected to the EPC network 103 via a Multi-service Node (MSN) 106. An EPC network provides various functions that support wireless services in the LTE environment. In one embodiment, an EPC network is an Internet Protocol (IP) packet core network that supports both real-time and non-real-time service delivery across a LTE network.

In one embodiment, a SIAD is a device that provides wireless traffic aggregation and backhaul from a cell site to an EPC network. A Multi-Service Node (MSN) provides layer 2 and layer 3 networking functions for wireless service between one or more SIADs and the EPC network. The eUTRAN 102 is the air interface of the 3GPP's Long Term Evolution (LTE) specifications for mobile networks. Namely, the eUTRAN comprises a radio access network standard that will replace previous generations of air interface standards. In one embodiment, the SIAD 105 and the MSN 106 communicate over a backhaul network 109. The backhaul network may also be referred to as a metro Ethernet transport network.

In EPC network 103, network devices such as Mobility Management Entity (MME) 107 and Serving Gateway (SGW) 108 support various functions as part of the LTE network 100. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as a mobility anchor for the user plane during inter-eNodeB handovers.

In addition, EPC (common backbone) network 103 may comprise a Home Subscriber Server (HSS) 191 that contains subscription-related information (e.g., subscriber profiles), performs authentication and authorization of a wireless service user, and provides information about the subscriber's location. The EPC network 103 may also comprise a Policy and Charging Enforcement Point (PCEF) 192 that supports accesses to subscriber databases and specialized functions of a charging system. The EPC network 103 may also comprise a Public Data Network Gateway (PDN GW) 193 (which may also be referred to as a packet data gateway (PDG or PGW) or evolved packet data gateway (ePDG)) which serves as a gateway that provides access between the EPC network 103 and various data networks, e.g., other IP networks, trusted or non-trusted networks 194-196 and the like. In one embodiment, a PDW may serves as an anchor for mobility between LTE and other wireless technologies, such as 2G and 3G wireless networks.

In one embodiment, the eUTRAN network 102, the backhaul network 109 and the EPC network 103 include various data bearer paths and signaling bearer paths, which may be referred to by specific labels. For example, the data bearer path on line 152 may be referred to as an S1-U bearer path and the data bearer path on line 153 may be referred to as an S5 or an S8 bearer path. In another example, the signaling bearer path between the eUTRAN and the MME 107 may be referred to as an S1-MME bearer path. Shown illustratively in FIG. 1, the S1 interface flow 152 is used to provide communication between an eNodeB, such as eNodeB 111, and a device in the EPC network 103, such as MME 107 and/or SGW 108. The SGi interface flow 154 is used to provide communication between the PGW 193 (also referred to as PDN GW 193) and the PCEF 192. The S5/S8 interface flow 153 is used to provide communication between the SGW 108 and PGW 193. It should be noted that the S1, S5, S8 and SGi interfaces are standard interfaces defined by the 3GPP standard. However, the present disclosure is not limited to these specific interfaces. In addition, it should be noted that LTE network 100 of FIG. 1 is only illustrative in nature. Thus, the number of network components or elements is not specifically limited as shown, and any number of network components or elements can be deployed.

Figure 2:
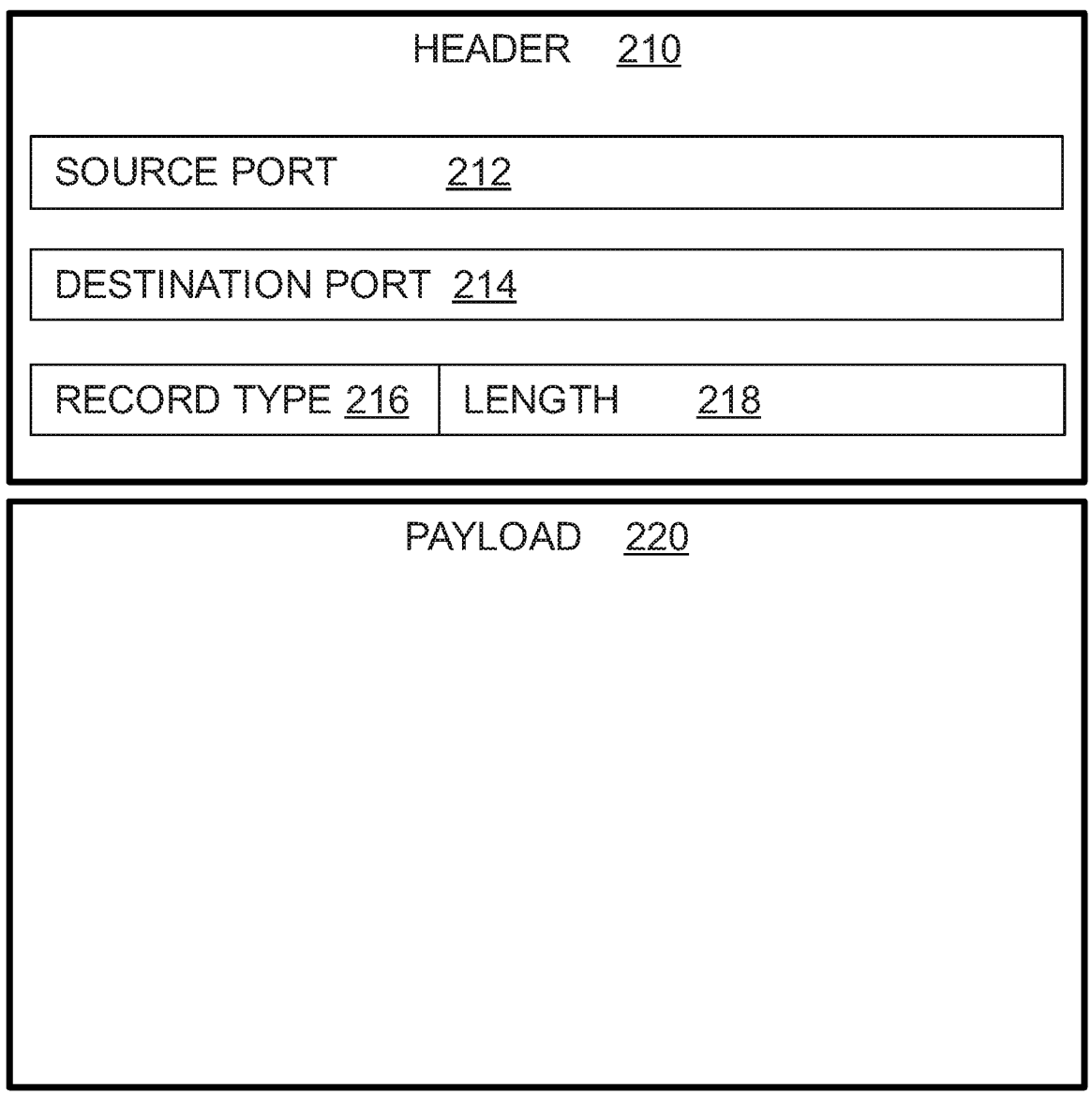
FIG. 2 illustrates an exemplary packet format, according to the present disclosure.

FIG. 2 illustrates an exemplary TCPv2 packet (or segment) format. It should be noted that TCP terminology generally refers to the data structure as a "segment" whereas other protocols, such as user datagram protocol (UDP) refer to a "packet." In the context of the present disclosure, the two terms are used interchangeably, both referring to a transport layer data structure for transmission of information over a communication network. As shown in FIG. 2, the TCPv2 packet 200 includes a header 210 and a payload 220.

Within the header 210 there are several fields including a source port field 212, a destination port field 214, a record type field 216 and a length field 218. Notably, the source port and destination port fields 212 and 214 do not correspond to the well know ports as used in TCP. Rather, the destination port field 214 is reserved for carrying a requesting system session ID (RSID) and the source port field 212 is reserved for carrying a serving system session ID (SSID). The RSID and SSID are unique values selected by the requesting system and the serving system respectively, and are used to uniquely identify a TCPv2 session. For example, an endpoint that starts a session may be the "requesting system" and may select the RSID. The endpoint that it is attempting to connect to may comprise the "serving system" and may select the SSID. Notably, the session identity has no dependence upon the IP addresses of the hosts (i.e., the requesting and serving system). Rather, it is defined only by the RSID and SSID combination (each of the RSID and SSID respectively being used depending upon the direction of the communication). In one embodiment, each of the hosts selects its own session ID and shares the selected session ID with the other host. In one embodiment, each of the session IDs is a 32 bit word. Hence, the source port and destination port fields 212 and 214 of the header 210 of TCPv2 packet 200 reserve 32 bits for each of the RSID and SSID. The use of RSID and SSID to identify a session enables the session to survive re-anchoring or transferring the session to different network, different IP address and/or different endpoint device, in contrast to the existing TCP/IP session being identified by the combination of IP address and TCP port number.

The exemplary header of a TCPv2 packet 200 also includes a record type field 216. The record type field 216 is reserved for a record type, which indicates the type of payload of the packet. In the context of the present disclosure, several exemplary record types for supporting the management of the security of a communication session are discussed below. The exemplary TCPv2 packet 200 also includes a length field 218, indicating a length of the packet. This helps to prevent exploits that seek to append additional data to a packet. The exemplary TCPv2 packet also includes a payload 220. The length, structure and contents of the payload 220 will vary depending upon the particular record type and purpose of the packet.

Notably, each of the TCPv2 data packets used in a session is encapsulated in a network layer header (e.g., an IP header) having at least a source IP address and a destination IP address. However, no changes to the Internet Protocol or to the IP headers is necessary. TCPv2 packets are compatible with all versions of the Internet Protocol (e.g., IPv4, IPv6, etc., and other layer 3 protocols). Thus, the encapsulation of a transport layer packet/frame with a network layer IP header/IP datagram may be performed in a manner understood by those skilled in the art.

In one embodiment, each of the hosts/endpoint devices in a session may maintain a session management table for the session storing the session parameters, which may include the current IP address of the peer host. Notably, the source IP address and destination IP address correspond to the initial IP addresses of the requesting host and the destination host at the time a session is established. However, a first device or host may change its IP address and notify one or more peer devices through a session re-anchor. In one embodiment, re-anchoring is achieved by a device sending a session re-anchor packet to one or more peers in the session. For instance, packet 200 may include a record type of "REAN" (re-anchor) in the record type field, indicating that the payload of the packet includes, at a minimum, a new IP address for communicating with the device. Upon receiving a REAN message, a peer device may then update its session management table to include the new IP address of the first device (as well as drop the old IP address), and begin sending communications (e.g., subsequent TCPv2 packets encapsulated in IP headers/IP datagrams) to the new IP address. Since the TCPv2 header includes a serving system session ID (SSID) field and a receiving system session ID (RSID) field, a session is tied to these unique identifiers, rather than IP address/L4 port tuples (as in the existing version of TCP). As such, sessions (using TCPv2) can survive a change in network through "re-anchoring" (e.g., watch a movie on a landline-connected tablet, switch to a mobility network, seamlessly).

In one embodiment, one or more of the messages exchanged in a session may comprise packets (e.g., in the form of TCPv2 packet 200) which are encrypted using a secret session key that is only known to the endpoint devices in the session. For example, in one embodiment when a session is first established a session key is negotiated using a Diffie-Hellman key exchange protocol. Each of two peers agrees to use a particular prime number and a base. These two numbers may be public. However, each of the two peers then selects a secret number, applies a formula according to Diffie-Hellman and sends the result to the peer device, which applies the inverse of the formula to receive the secret number of the other device. Having selected its own secret number and having determined the secret number of the peer, each of the peers is then able to calculate a shared secret key that can only be created by using both of the secret numbers. Notably, each of the peers is able to calculate the same secret key based upon having both of the secret numbers selected by the peers. The secret key is then used as a "session key." Thus, some or all of the messaging between the peers may then be encrypted prior to transmission using the session key. Advantageously, by requiring that all re-anchoring request packets be encrypted using the session key, devices in the communication session may discern spurious re-anchor requests. For example, a man-in-the-middle attacker may send a re-anchor request to one of the endpoints attempting to have the endpoint update its session management table to include an IP address of the attacker's device. However, if the session re-anchor request packet is not encrypted using the session key, the endpoint receiving the re-anchor request may know that the request is not legitimate. As such, the detection of an invalid re-anchor request may trigger a security management procedure according to embodiments of the present disclosure.

Following from the foregoing, in one embodiment the packet 200 is used for messaging (e.g., OA&M messaging) in connection with managing the security of a communication session. In particular, the payload of packet 200 may be used to convey information to peer endpoints describing details of a detected attack. Similarly, the payload of packet 200 may be used to propose a particular response to the detected attack, to confirm that a proposed response to a detected attack is acceptable or to propose a different response to the detected failure condition/attack. In this regard, different record types may be placed in the record type field to indicate the different purposes of the packets and the different information to be found in the payloads. For example, for purposes of the present disclosure a record type of ANM (attack notification message) may indicate that the payload of packet 200 is for providing details of the detected attack. A record type of PSA (proposed security action), may indicate that the payload of the packet 200 is for indicating a proposed security action to take in response to a detected attack. For instance, an endpoint may receive a packet 200 having a record type of ANM from a peer endpoint. After processing the information contained in the ANM message the endpoint may select a security action/response to the detected attack and, in turn, send a packet 200 having a record type of PSA proposing the selected response to the peer endpoint. In one embodiment, a record type of SAC (security action confirmation) may indicate that a payload of packet 200 includes a confirmation of a proposed response. The confirmation may include a positive confirmation or a negative confirmation. For example, a positive confirmation may include an indication that the proposed security action is accepted by an endpoint (e.g., in response to receiving a PSA message from a peer device). A negative confirmation may either explicitly decline the proposed response/security action conveyed in the PSA message, or may proposed a different or alternative response/security action to take in response to the detected attack. In one embodiment, to provide enhanced security, management packets such as ANM, PSA and SAC are encrypted using the session key described above. In short, the packet structure 200 supports a notification of a detected failure condition/attack and the negotiation of an appropriate response to a detected attack.

Figure 3:
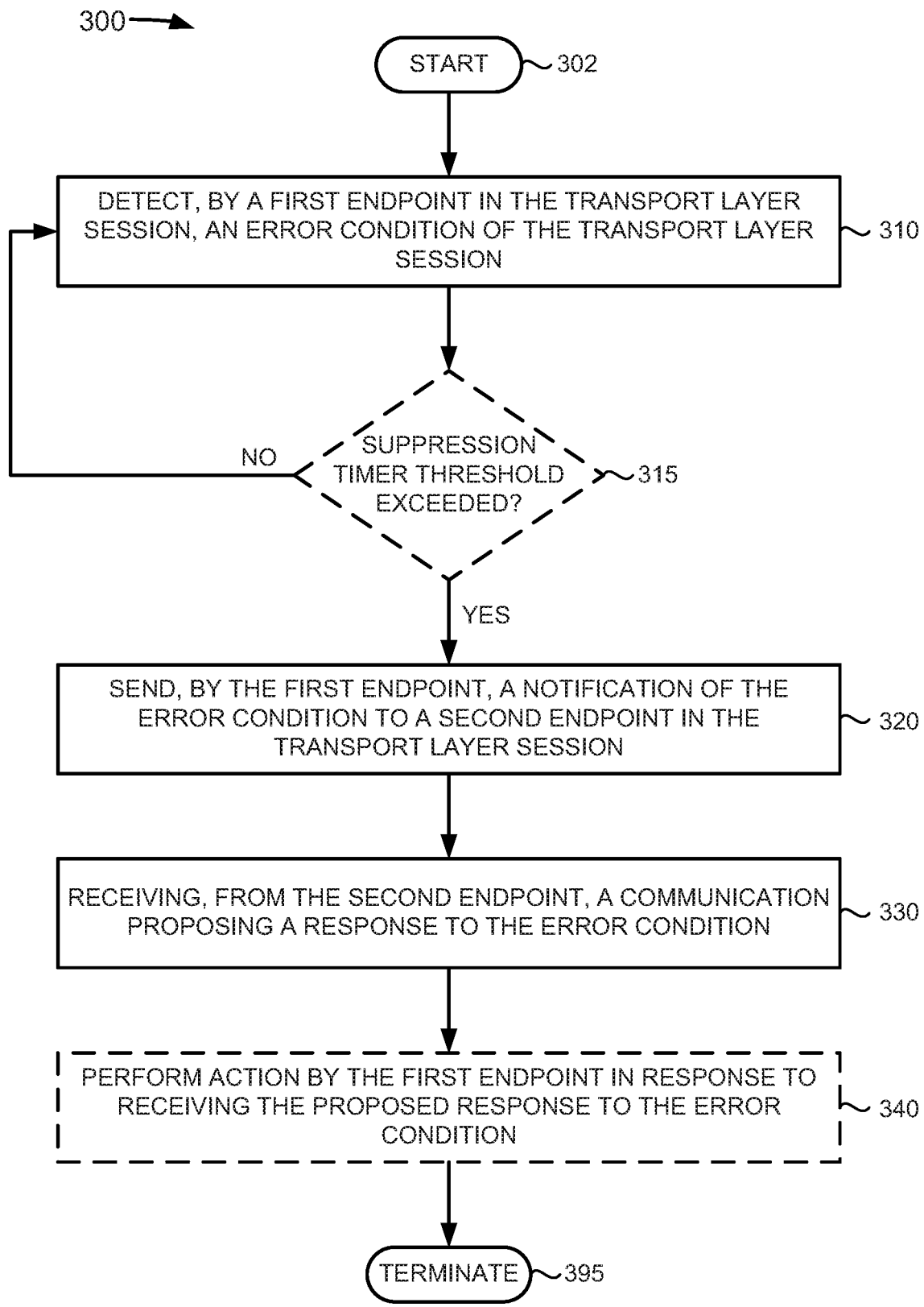
FIG. 3 illustrates a flowchart of a method for managing the security of a communication session in a communication network, according to the present disclosure.

FIG. 3 illustrates an exemplary method 300 for managing security of a communication session (e.g., the transport layer in one embodiment and any other layers) in a communication network (e.g., a session using TCPv2 packets). In one embodiment, the method 300 may be performed by a first endpoint device in an ongoing communication session with one or more other endpoint devices. For instance, the method 300 may be performed by endpoint device/user equipment 101 in FIG. 1 in communication with endpoint device/user equipment 151. It should be noted that in the present context an endpoint device may also comprise a server, requesting host, destination host or other peer device that is part of a communication session and is not strictly limited to a "user equipment" such as a cellular telephone, a smart phone, a computing tablet, a desktop or laptop computer and the like. In one embodiment, an endpoint device may execute one or more applications or application programs which perform one or more steps/functions/operations of the method 300. For example, the application or application programs may comprise computer readable code and/or instructions stored on a memory and executed by a processor of the endpoint device. Alternatively, or in addition, one or more of the steps/functions/operations of the method 300 may be performed by a security manager which, in one embodiment, may also comprise an application or application program that is executed by an endpoint device. In addition, in one embodiment, the steps/functions/operations of method 300 may also be performed by a computing device 500 as described in connection with FIG. 5.

The method 300 begins in step 302 and proceeds to step 310 where the method detects an error condition of the communication session, e.g., a transport layer session. For example, a first endpoint in a communication session may detect an error condition of the communication session in any of a number of ways and for any of a number of reasons. For instance, an attack, or a suspected attack, may be detected upon receiving a packet and determining that the packet comprises an improperly formed session management/OA&M message, such as an improperly formed or improperly encrypted re-anchor request, attack notification message, session transfer message, and the like. For example, an attack may seek to append malicious code to the end of a packet, but the method may detect that the packet exceeds a session parameter of a maximum packet size agreed upon between the endpoints of the communication session during session setup. In one embodiment, the detected failure condition/attack may comprise an attempt to hijack a session or a successful hijacking of the session. For instance, an attack may comprise a denial of service attack. In one embodiment, the denial of service attack may comprise a large number of re-anchor requests or other improper OA&M messages having the only purpose of tying up resources of one or more of the endpoints in the communication session. In one embodiment, at step 310 the method 300 may additionally or alternatively detect one or more failure conditions such as a bad gateway, a broken link, and the like. In one embodiment, an error condition may arise where there is an unsuccessful attempt to hijack a communication session which nevertheless causes the legitimate endpoints to the session to be completely or partially unable to communicate (e.g., by tying up resources by flooding a large number of bogus messages through the network and/or to the endpoints of the session). Thus, where the present disclosure describes responses to a detected attack, it should be understood that in other, further and different embodiments a detected "failure condition" may be handled in substantially the same manner.

Following step 310, the method proceeds to step 320, or optionally to step 315. At step 315, the method 300 determines if there are any suppression timers for the detected attack (and/or failure condition). For instance, if this is not the first detection of the same event and if the other endpoint is already notified, the method 300 does not necessarily need to send an additional notification of the event. As such, the method 300 may maintain one or more suppression timers for one or more previously detected events. In one embodiment, if the method 300 determines that a suppression timer exists for the event, then the method determines whether to send a message to a peer endpoint in accordance with the suppression timer. For example, if a threshold of the suppression timer has expired, the method 300 may proceed to step 320 and send a subsequent notification. However, if the suppression timer has not yet expired, the method 300 will not send a notification and may proceed back to step 310 to detect subsequent error condition(s). For instance, a suppression timer may specify that messages notifying of a detected attack be sent at most once per second, to prevent floods from the same source, or once every 200 millisecond to prevent multisource floods. This is only one illustrative example. If the error condition detected at step 310 is the first detected error condition for an event, the method may simply proceed directly from step 310 to step 320.

In step 320, the method 300 sends a notification of the attack to a second endpoint in the transport layer session. For example, the first endpoint may create and send a packet (e.g., a TCPv2 packet) comprising an attack notification message (ANM). The message may include various details regarding the detected attack such as: all or a portion of the suspected attack code, an offending message fragment, a source of the detected attack, such as an originating IP address, and the like. In one embodiment, an attack may comprise a number of packets from one or more sources. Hence, details regarding the attack may comprise a number of attack messages received, the source address(es) of the packets comprising the attack, and so forth. In one embodiment, a detected failure condition comprises a bad gateway or a broken link. Accordingly, details regarding the failure condition may comprise the address of the bad gateway or link, and interface address for reaching the bad gateway or link, an error code, if the cause of the failure of the gateway or link is known, and the like. Although the above assumes only a single packet notifying of a detected failure condition or attack, it should be noted that the present disclosure is not so limited. Namely, in other, further and different embodiments, the notification/message may comprise two or more packets. In one embodiment, the notification is a subsequent packet following the expiration of a suppression timer. In one embodiment, the notification is sent in a packet in an OA&M side-stream to a data session. In one embodiment, the notification message is sent in one or more packets having a form of packet 200 of FIG. 2. For instance, the record type field of packet 200 may contain the record type "ANM" indicating that the packet is an attack notification message. The payload may comprise the details of the failure condition/attack as described above. In one embodiment, the notification is sent in a packet encrypted using a session key for the transport layer session, as described above. In addition, although step 320 involves notifying a second endpoint of a detected attack, it should be understood that in one embodiment, a notification may also be provided to an application running on the first endpoint. For example, a session may be initiated by an application layer program, such as a web browser initiating a session with a remote web server to obtain a hypertext markup language (HTML) document. Thus, notification of the detected attack may be passed up the protocol stack to the application layer program. The application layer program may choose to respond in any number of ways. For instance, the application layer program may choose to terminate a connection in response to an attack, even though the local security policy does not necessarily require such a drastic response and would allow other alternatives. Further, in one embodiment, notification is also provided to a security policy manager, which may reside on the first endpoint device, or may reside on another device, such as a network firewall router. For instance, the security policy manager may be responsible for local security policy that indicates required or permissible responses to the detected attack. In addition, in one embodiment, the security policy manager is tasked with sending the notification of the detected attack to the second endpoint at step 320.

At step 330, the method 300 receives a communication from the second endpoint proposing a response to the error condition. In one embodiment, the communication comprises a PSA message, which may also be encrypted using a session key, as described above. For example, the second endpoint may receive one or more packets (e.g., one or more ANM packets) notifying of a detected error condition from the first endpoint. Upon receiving information about the detected error condition, the second endpoint may process the information in order to select a response to the detected error condition. For instance, the second endpoint may include a security policy manager having one or more security policies that may apply in various circumstances. For example, one security policy may specify that a session should be dropped upon a detection of any suspected attack (a strict security policy). Another security policy may specify that no action should be taken, notwithstanding the detection of an attack/suspected attack. For example, if the communication session is simply supporting a client-server web browsing session with information that is already made publicly available over the internet, the security policy may not care. On the other hand, a security policy may specify that if a user is logged on to a streaming video service and the session is supporting streaming video of copyrighted material, then a more severe action (e.g., dropping the session) should be taken. Another security policy at an endpoint may specify that a session should be dropped in response to any detected attacks on a session involving a peer endpoint on a different network, whereas a detected attack on a session involving only the endpoint and a peer device on the same local network should be handled differently. The foregoing are only several examples of possible security policies and corresponding actions. Alternative actions to take in response to a detected failure condition/attack may comprise: logging parameters/information pertaining to the transport layer session in a database (e.g., for future analysis, correlating with information on other suspected attacks against the current session or different sessions, etc.), upgrading to a more secure cipher suite, e.g., using a larger key size, beginning to encrypt communications using a session key, reducing an acknowledgement window size, re-negotiating a session key, changing session identifiers (e.g., RSID and/or SSID), agreeing to renegotiate session keys at a more frequent intervals, shortening the valid duration of a session key and re-anchoring/transferring a session to a different network, to a different interface or to a different device, among other things. Several exemplary security responses are discussed below in more detail.

More specifically, in one embodiment a proposed security response may comprise changing one or more of the session identifiers (e.g., the RSID and/or SSID). In one embodiment, a change in session identifier(s) is accomplished through the use of a session re-anchor packet, at the same time as a session re-anchoring. In another embodiment, a change of session identifiers is a separate security response in which one or more of the devices in the communication session choose a new session identifier and convey the choice to one or more peers. In one embodiment, the proposed security action may not necessarily propose the immediate changing of session identifiers, but may comprise a proposal to change session keys more often. For example, the endpoints in a session may have agreed to update session keys according to a particular schedule, but in response to a detected attack, may determine to change session keys on a more frequent basis. In one embodiment, the proposed security response may actually comprise a re-authentication challenge to the first endpoint device. For instance, the proposed security response may be to continue the session, but only if the first endpoint device can successfully pass a re-authentication process of the second endpoint device.

In still another embodiment, a proposed response may comprise sending a notification to one or more users at one or more of the devices that are part of the communication session, e.g., through a pop-up window presented on a display. For example, if the session supports a credit card or banking transaction, the proposed response may comprise locking out one or more features. In this regard, it should be noted that the process of determining a security response and the corresponding action(s) to be taken are not necessarily limited to the transport layer. Rather, security actions may involve the application layer and even the solicitation for end user input, e.g., where one or more end users make the ultimate decision as to whether to continue a transport layer session, to close the session, to re-anchor via a different network, etc., and where a security response may comprise actions at the application layer, such as locking out certain features, requiring a user to input further credentials, and so forth.

In any case, after selecting a security action, the second endpoint sends a message (e.g., in one or more packets, such as a PSA packet as described above) to the first endpoint proposing the selected response. The message is received by the first endpoint at step 330, following which the method 300 may optionally proceed to step 340.

At step 340, the method 300 performs an action in response to receiving the communication proposing a response to the error condition at step 330. For example, the method 300 may simply perform the action proposed in the communication received at step 330. Alternatively, or in addition, the method 300 may send a confirmation message, which may also be encrypted using a session key, as described above. More specifically, the first endpoint may receive a message from the second endpoint (e.g., a PSA message), the message having a proposed security action/response to the detected attack. The method 300 may then implement local security policies (e.g., of the first endpoint) to determine if it can agree to the proposed security action. For example, if the second endpoint is a cellular endpoint device, it may propose that the session be transferred from itself to a desktop computer. While the second endpoint may deem this action to provide a greater level of security, the desktop computer may reside in a network that is untrusted by the first endpoint. For example, this may violate one or more security policies of the first endpoint. In this regard, it should be noted that all or a portion step 340 may be performed by a security policy manager that may reside within the first endpoint device or may be accessible by the first endpoint device (e.g., in network firewall router). Alternatively, or in addition, the first endpoint may maintain a list of trusted peers, and if the proposed new endpoint is not on the list, the first endpoint may decline the transfer. As such, the method 300 may not agree to the session transfer. Accordingly, in step 340 the method 300 may perform an action that comprises sending a negative confirmation (e.g., in a SAC packet as described above) declining the proposed response to the attack. The foregoing is only one example. Thus, it should be appreciated that there are various other reasons why a first endpoint might decline a particular security action/response. It should also be noted that a declination of a proposed response may also include a counter-proposal, an invitation to provide a subsequent proposal or may simply be an outright denial. Thus, in some cases, the second endpoint may receive a counter-proposal, compare the counter-proposal against its own security policies, and accept, decline or send a further counter-proposal, and so forth.

On the other hand, the first endpoint may in fact agree to the proposed response to the attack. If so, at step 340 the method 300 may send a positive confirmation (e.g., in a SAC packet as described above) indicating that the proposed action will be followed. For example, a proposed security action/response to the attack may be to start encrypting all data communications using a session key negotiated at the beginning of the session. Thus, a confirmation message may be sent at step 340 agreeing to the upgrade. Thereafter, the first endpoint simply begins sending all subsequent data packets encrypted using the session key, or taking a different security action depending upon what was proposed in the communication received at step 330.

For example, in one embodiment a proposed security response is to move the transport layer session to a different interface or network connection. For example, the second endpoint may send a PSA message proposing to re-anchor the session from a wireless local area network connection to a cellular network connection. The second endpoint may include a new address that it intends to use in the cellular network as part of the PSA message. If the first endpoint agrees to accept the re-anchoring request, the first endpoint may update an address of the second endpoint in a session management table, send a confirmation at step 340 (e.g., in a SAC packet) and simply begin sending subsequent packets to the new address in the cellular network. However, in another embodiment, the second endpoint may not convey a new address when proposing a response/security action. Rather, in such an embodiment, the second endpoint may propose a session re-anchor as an appropriate security action/response. The method 300 may (at step 340) accept the proposal by conveying a confirmation message. Thereafter, the second endpoint may send a re-anchor request message beginning the actual process of re-anchoring the session. An exemplary process for re-anchoring a session is described in the above mentioned co-pending commonly assigned application "Initiating and Maintaining Sessions between Endpoints", which is incorporated by reference herein in its entirety.

It should again be noted that the foregoing are merely a few embodiments of the present disclosure for managing security of a communication session in a communication network. As such, the present disclosure is not strictly limited to any one or more particular examples of security policies, response/security actions and the like that are described herein. As another example, in one embodiment at step 310, the method 300 may send a proposed response to the detected attack along with the initial notification. Thus, the method 300 may not simply wait for a proposed security action from the second endpoint, but may proactively make the first suggestion for an appropriate response, which the second endpoint may then be tasked with accepting or declining the proposal.

In any case, following step 340 the method 300 proceeds to step 395 wherein the method terminates.

Figure 4:
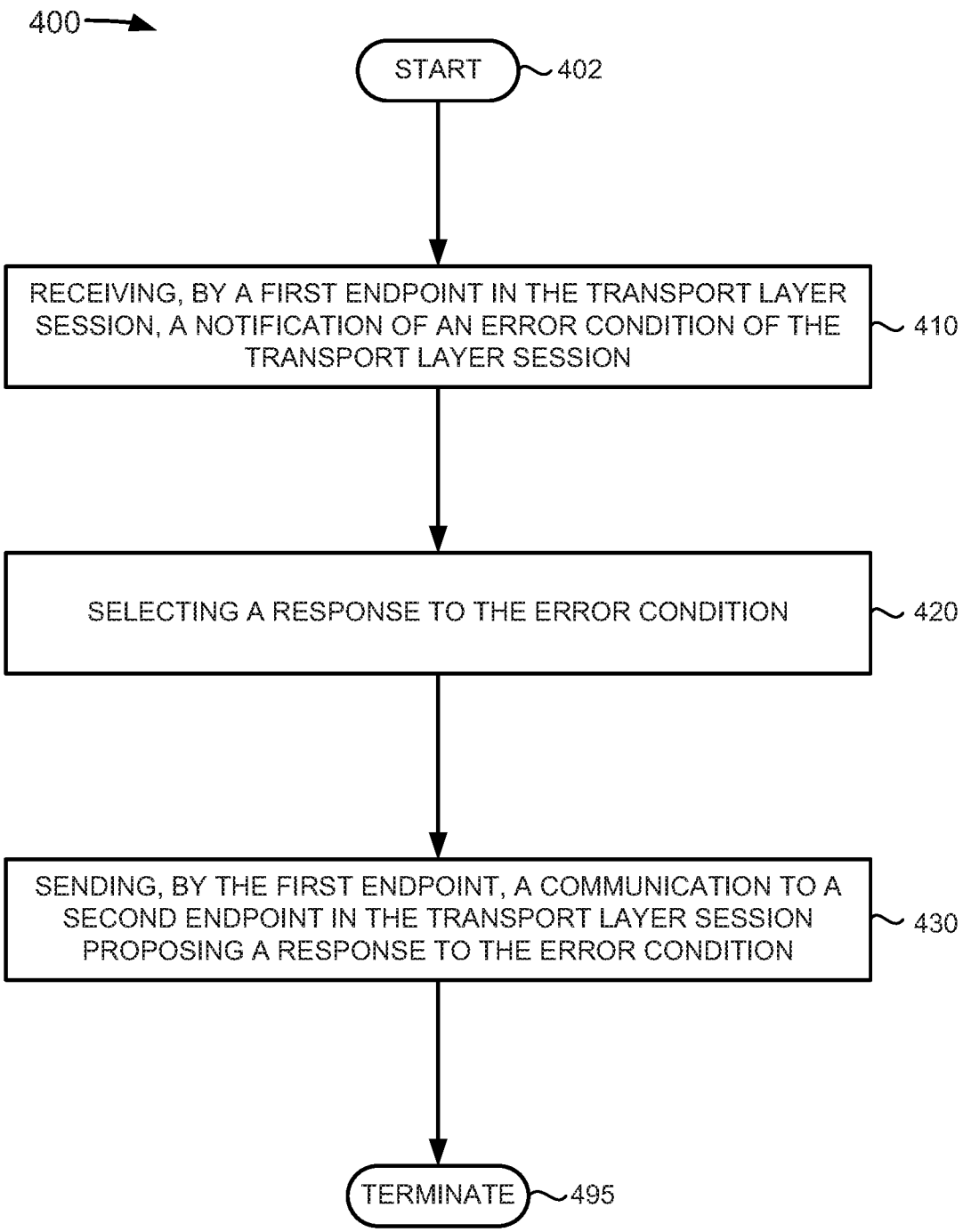
FIG. 4 illustrates a flowchart of a further method for managing the security of a communication session in a communication network, according to the present disclosure.

FIG. 4 illustrates another exemplary method 400 for managing security of a communication session in a communication network (e.g., a session using TCPv2 packets). In one embodiment, the method 400 may be performed by a first endpoint device in an ongoing session with one or more other endpoint devices. For instance, the method 400 may be performed by endpoint device/user equipment 151 in FIG. 1 in communication with endpoint device/user equipment 101. In addition, in one embodiment, the steps/functions/operations of method 400 may also be performed by a computing device 500 as described in connection with FIG. 5.

The method 400 begins in step 402 and proceeds to step 410 where the method receives a notification of an error condition of a communication session, e.g., a transport layer session. For example, the notification may be received by the method 400 at a first endpoint in the communication session. In one embodiment, the notification comprises an attack notification message/packet (e.g., an ANM packet) that is sent by a second endpoint in the communication session. The notification message may be sent and received substantially as described above in connection with steps 320 and 330 of the method 300.

Following step 410, the method 400 proceeds to step 420 where the method selects a response to the error condition. The selection of a response to the error condition may proceed in substantially the same manner as described above in connection with step 330 of the method 300 above. For example, the method 400 may perform substantially the same functions and follow the same processes of the "second endpoint" described in the method 300 above. For instance, the method 400 may receive an attack notification message notifying of a suspected attack. The suspected attack may comprise an improperly formed session management/OA&M message, such as an improperly formed or improperly encrypted re-anchor request, attack notification message, session transfer message, and the like, or a failure condition such as a bad gateway or a broken link. In response, the method 400 may determine any one or more security responses such as: logging parameters/information pertaining to the session in a database (e.g., for future analysis, correlating with information on other suspected attacks against the current session or different sessions, etc.), dropping the session, taking no action, re-negotiating or upgrading to a more secure cypher suite, codec and/or cryptographic algorithm, beginning to encrypt communications using a session key, re-negotiating a session key, changing session identifiers (e.g., RSID and/or SSID), and re-anchoring/transferring a session to a different network, to a different interface or to a different device, among other things. The method 400 may implement one or more security policies in selecting a response to the error condition. For example, the method 400 may implement local security policies of a security policy manager residing on an endpoint device (e.g., endpoint device 151 in FIG. 1).

Following step 420, the method 400 proceeds to step 430 where the method sends a communication to a second endpoint in the transport layer session proposing a response to the error condition. In one embodiment, the communication comprises a proposed security action (PSA) packet sent by the method 400 via the first endpoint to a second endpoint. In one embodiment, the communication sent at step 430 is encrypted using a session key for the communication session.

Following step 430 the method 400 proceeds to step 495 wherein the method terminates.

It should be noted that although not explicitly specified, one or more steps of the respective methods 300 and 400 described herein may include a storing, displaying and/or outputting step as required for a particular application. In other words, any data, records, fields, and/or intermediate results discussed in the method can be stored, displayed, and/or outputted to another device as required for a particular application. Furthermore, operations, steps or blocks in FIGS. 3 and 4 that recite a determining operation or function, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

It should be noted that the above examples are only illustrative. In other words, protocol fields in addition to those described above may be included in the TCPv2 header and/or payload. Similarly, the exemplary record-types/message-types described above are only illustrative in nature. Thus, it should be understood that numerous other, further and different record types for data, OA&M messaging and other purposes fall within the scope of the present disclosure. As mentioned above, embodiments of the present disclosure (TCPv2) are extensible insofar as additional record-types may be created and defined as necessary for various purposes. In this regard, it should also be noted that one embodiment may use TCP packets according to the existing protocol that are modified to be non-compliant with the protocol. For instance, in one embodiment the header according to the existing TCP format is modified to convey OA&M messages pertaining to a detected attack. For example, the options field in the TCP header contains 24-32 bits (with padding) that may be used to convey notification of an attack. Different codes of up to 24-32 bits may be selected to convey notification of different types of attacks. In one embodiment, the packet may comprise an acknowledgement packet (ACK) with no data (payload length zero) having a sequence number the same as the last ACK packet. This combination of features may signal to a receiving device that the packet is not actually an ACK packet, but comprises an attack notification and that the bits in the options field should be read as an attack notification. While it may not be possible to convey detailed information pertaining to the attack in this way (e.g., it may not be possible to include all of the offending code), a limited attack notification-response message exchange can nevertheless be provided in this manner.

In addition, although several of the above examples describe sessions between only two peer hosts, the present disclosure is not so limited. Namely, in other, further and different embodiments a TCPv2 session may comprise a multicast session (e.g., a one-to-many type session, a conference type session, and the like involving a plurality of peers in a single session). Internet Protocol version 6 (IPv6) specifically contemplates multicast communications and includes multiple destination IP address fields in the IP header. As such, security response packets (e.g., ANM, PSA and SAC packets), session establishment packets, data packets, acknowledgment packets, re-anchoring notification packets, and any other type of TCPv2 packet not specifically described herein, may be multicast to various peers at various different IP address. Likewise, any one or more peers in a multicast session may also send notifications of detected attacks, propose security responses and send confirmations in the same manner described above.

Figure 5:
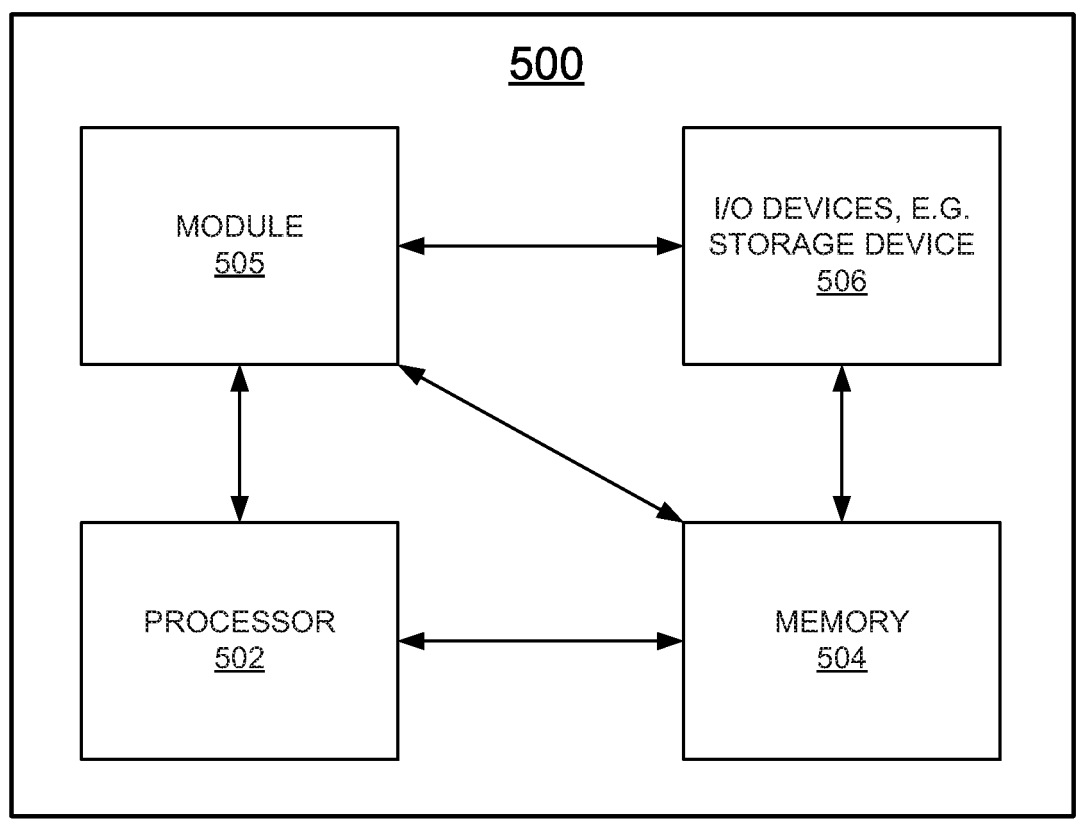
FIG. 5 illustrates a high level block diagram of a general purpose computer suitable for use in performing the methods, operations and functions described herein.

FIG. 5 depicts a high level block diagram of a general purpose computer suitable for use in performing the methods, steps, operations and/or functions described herein. As depicted in FIG. 5, the system 500 comprises a processor element 502 (e.g., a CPU), a memory 504, e.g., random access memory (RAM) and/or read only memory (ROM), a module 505 for managing security of a communication session in a communication network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed methods. In one embodiment, the present module or process 505 for managing security of a communication session in a communication network can be implemented as computer-executable instructions (e.g., a software program comprising computer-executable instructions) and loaded into memory 504 and executed by processor 502 to implement the steps, functions and operations as discussed above. As such, the present process 505 for managing security of a communication session in a communication network (including associated data structures) of the present disclosure can be stored on a non-transitory (e.g., tangible and physical) computer readable storage medium, e.g., RAM memory, magnetic or optical drive or diskette and the like. In this regard, it should be noted that any one or more of the devices described in connection with the above FIGS. 1-4 may be embodied by the system 500.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A first endpoint for managing a communication session, the first endpoint comprising:
a processor; and
a non-transitory computer-readable medium storing instructions which, when executed by the processor, cause the processor to perform operations, the operations comprising:
detecting an error condition associated with the communication session, wherein the first endpoint and a plurality of additional endpoints comprising at least a second endpoint and a third endpoint are participating in the communication session; and
sending a notification of the error condition to the plurality of additional endpoints using a first transport layer session management message of a transport layer session, wherein the communication session includes the transport layer session, wherein a header of the first transport layer session management message includes a record type, wherein the record type indicates that a payload of the first transport layer session management message contains session management information, and wherein the notification includes a proposed response to the error condition.

2. The first endpoint of claim 1, the operations further comprising:
receiving a communication from the second endpoint via a second transport layer session management message of the transport layer session, the communication accepting the proposed response to the error condition or presenting a different proposed response to the error condition.

3. The first endpoint of claim 1, wherein the error condition comprises an attack on the communication session.

4. The first endpoint of claim 3, wherein the attack comprises an invalid re-anchor request.

5. The first endpoint of claim 3, wherein the attack comprises a denial of service attack.

6. The first endpoint of claim 1, wherein the proposed response comprises switching to a different set of session identifiers for the transport layer session.

7. The first endpoint of claim 1, wherein the proposed response comprises re-negotiating a session key for the transport layer session.

8. The first endpoint of claim 1, wherein the proposed response comprises re-anchoring the transport layer session.

9. The first endpoint of claim 1, wherein the proposed response comprises transferring the transport layer session to a different endpoint.

10. The first endpoint of claim 1, wherein the proposed response comprises dropping the transport layer session.

11. The first endpoint of claim 1, wherein the proposed response comprises continuing the transport layer session without a modification.

12. The first endpoint of claim 1, wherein the proposed response comprises renegotiating a cryptographic algorithm for the transport layer session.

13. The first endpoint of claim 1, wherein the proposed response comprises changing a frequency for renegotiating a session key for the transport layer session.

14. The first endpoint of claim 1, wherein the proposed response comprises re-authenticating the first endpoint.

15. The first endpoint of claim 1, wherein the first transport layer session management message is encrypted using a session key of the transport layer session.

16. The first endpoint of claim 1, wherein the transport layer session comprises a transmission control protocol session that is identified by a requesting system session identifier and a serving system session identifier.

17. The first endpoint of claim 2, the operations further comprising:
sending a further communication via a third transport layer session management message of the transport layer session accepting the different proposed response.

18. A first endpoint for managing a communication session, the first endpoint comprising:
a processor; and
a non-transitory computer-readable medium storing instructions which, when executed by the processor, cause the processor to perform operations, the operations comprising:
receiving a notification of an error condition associated with the communication session from a second endpoint, wherein the first endpoint and a plurality of additional endpoints comprising at least the second endpoint and a third endpoint are participating in the communication session, wherein the notification of the error condition is received via a first transport layer session management message of a transport layer session, wherein a header of the first transport layer session management message includes a record type, wherein the record type indicates that a payload of the first transport layer session management message contains session management information, wherein the communication session includes the transport layer session, and wherein the notification includes a proposed response to the error condition; and
sending a communication to at least the second endpoint using a second transport layer session management message of the transport layer session, the communication accepting the proposed response to the error condition or presenting a different proposed response to the error condition.

19. The first endpoint of claim 18, wherein the proposed response comprises at least one of: switching to a different set of session identifiers for the transport layer session, re-negotiating a session key for the transport layer session, re-anchoring the transport layer session, transferring the transport layer session to a different endpoint, dropping the transport layer session, or continuing the transport layer session without a modification.

20. A tangible computer-readable medium storing instructions which, when executed by a first endpoint comprising at least one processor, cause the at least one processor to perform operations for managing a communication session, the operations comprising:
receiving a notification of an error condition associated with the communication session from a second endpoint, wherein the first endpoint and a plurality of additional endpoints comprising at least the second endpoint and a third endpoint are participating in the communication session, wherein the notification of the error condition is received via a first transport layer session management message of a transport layer session, wherein a header of the first transport layer session management message includes a record type, wherein the record type indicates that a payload of the first transport layer session management message contains session management information, wherein the communication session includes the transport layer session, and wherein the notification includes a proposed response to the error condition; and
sending a communication to at least the second endpoint using a second transport layer session management message of the transport layer session, the communication accepting the proposed response to the error condition or presenting a different proposed response to the error condition.

* * * * *